United States Patent [19]

Haas

[11] 4,341,733
[45] Jul. 27, 1982

[54] METHOD OF AND DRIVE FOR ACTUATING ABSORBER RODS IN PEBBLE BED REACTORS

[75] Inventor: Herbert Haas, Aachen, Fed. Rep. of Germany

[73] Assignee: Kernforschungsanlage Jülich Gesellschaft mit beschränkter Haftung, Jülich, Fed. Rep. of Germany

[21] Appl. No.: 119,764

[22] Filed: Feb. 8, 1980

[30] Foreign Application Priority Data

Feb. 9, 1979 [DE] Fed. Rep. of Germany ....... 2904941

[51] Int. Cl.³ .............................................. G21C 7/16
[52] U.S. Cl. .................................................... 376/226
[58] Field of Search ...................... 176/36 R, 58 PB; 376/219, 223, 226

[56] References Cited

U.S. PATENT DOCUMENTS

| 3,432,387 | 3/1969 | Jonsson | 176/36 R |
| 3,627,632 | 12/1971 | Acher et al. | 176/36 R |
| 3,751,336 | 8/1973 | Angelini et al. | 176/36 R |
| 3,844,884 | 10/1974 | Frank et al. | 176/36 R |
| 3,855,059 | 12/1974 | Groves et al. | 176/36 R |
| 3,979,258 | 9/1976 | Schweiger et al. | 176/36 R |

FOREIGN PATENT DOCUMENTS

| 1589498 | 4/1970 | Fed. Rep. of Germany | 176/36 R |
| 2412775 | 9/1975 | Fed. Rep. of Germany | 176/36 R |
| 878332 | 9/1961 | United Kingdom | 176/36 R |
| 539299 | 12/1976 | U.S.S.R. | 176/36 R |

OTHER PUBLICATIONS

Kent's Mechanical Engineers Handbook, 12th Ed., ©1964, John Wiley & Sons, N.Y., Carmichael Editor, pp. 15-36-15-37, 15-93-15-95.

Primary Examiner—Sal Cangialosi
Attorney, Agent, or Firm—Becker & Becker, Inc.

[57] ABSTRACT

A method of actuating absorber rods in pebble bed reactors, according to which the rod is moved into or out of the ball pile with limited advancing speed in a turning or rotary manner. A feeding or advancing force is transmitted onto the rod being introduced, and this force does not exceed the appropriate maximum value of the ball strength and the rod stability. The drive provided for the foregoing procedure effects both a longitudinal shifting and rotation of a rod connected therewith, and has an axially fixed advancing spindle, the spindle nut of which is rigidly connected with the absorber rod and is journalled in a rotary pipe or tube in such a way as to be axially displaceable yet fixed against rotation, with the rotary tube being driven at a constant speed. During removal or outward travel of the rod from the ball pile, a fixed transmission ratio exists between the driving mechanism and driven end, which fixed transmission is generated with the aid of a freewheel or free-running drive. A coupling is provided between the drive motor and the spindle to limit the transferrable torque or turning moments according to a predetermined characterizing line or curve, whereby the rotary speed of the spindle is limited during introduction of the rod into the ball pile by the freewheel or free-running drive causing engagement when the driven end speed of the coupling equals the driving speed. The coupling between the drive motor and the spindle may be found by a hydraulic coupling of oil pump and oil motor, or by a Föttinger coupling.

4 Claims, 2 Drawing Figures

METHOD OF AND DRIVE FOR ACTUATING ABSORBER RODS IN PEBBLE BED REACTORS

The present invention relates to a method of actuating absorber rods in pebble bed reactors, according to which the rod, with limited advancing speed, is rotatingly moved into or out of the ball pile. The invention furthermore encompasses a drive adapted for this purpose, with an axially fixed feeding or advancing spindle, the spindle nut of which is rigidly connected with the absorber rod and is journalled in a rotary tube or pipe in such a way as to be axially displaceable yet fixed against rotation, with the rotary tube being driven at a constant speed. During removal of the rod out of the ball pile, a fixed transmission ratio exists between the driving mechanism and driven end, which fixed transmission is generated with the aid of a free-running drive or freewheel.

Absorber rods for the control or regulation of ball-pile reactors can be introduced into the ball pile or fill in differing manners: for one, straight, smooth rods known as "lift or stroke rods or bars" can be pressed with high axial force into the fill to the desired depth. Another possibility is to introduce or move the absorber rods with a turning or rotating movement into the fill; the absorber rods or bars are provided with a threaded profile on the exterior thereof and are designated as "turning or rotary rods or bars". Such rotary rods have a certain similarity to conveyor worms.

The rotary drive and the feeding or advancing drive of such rotary rods is effected by drive shafts introduced coaxially into the primary gas chamber. In particular, the rotary movement of a rotary pipe is transmitted onto the rod, which is guided in the rotary pipe so as to be fixed against rotation yet axially movable. The feed or advance is effected by an axially fixed or stationary spindle, the spindle nut of which moves along the spindle with the coupled-on rod.

During the introduction of such rotary rods into the ball pile, considerable forces arise, on the one hand between the balls and the advancing or penetrating rod, and on the other hand secondarily within the advancing or penetrating rod itself. Furthermore, due to the outer thread contour of the rod, there occurs, during the movement of the rod in the ball pile, a mixing-through of the balls which is undesired and, with a given thread profile, is a function of the ratio between the rotational speed and the feed or advance speed.

On the other hand, the activity of the rods occurring within the primary gas chamber permits no extensive switching or control elements or influencing measures from the outside. Therefore, attempts have been made to optimize the feeding or advancing speed of such rods, with a view toward minimal damage to the balls and the rod and to the least possible mixing-through of the balls. Also with such optimized, fixedly adjusted feeding or advancing speeds of the rod, however, considerable changing loads and force peaks occur at the rods which naturally also have an effect upon the balls. Moreover, the balls are also mixed through or intermixed if, for reasons of the axial force, no advancing or conveying effect would be necessary.

It is therefore an object of the present invention to provide a method, and a drive adapted therefor, with which the aforementioned difficulties are substantially eliminated by the fact that especially the spindle is protected against bending and that breakage of the balls is avoided, while the conveying effect of the rod, which is undesired with respect to a ball intermixing, is reduced to a minimum.

This object, and other objects and advantages of the present invention, will appear more clearly from the following specification in connection with the accompanying drawings, in which.

The method of the present invention is characterized primarily in that an advancing or feeding force is transmitted onto the rod moved or introduced into the ball pile which does not exceed a maximum value in conformity with the ball strength and the rod stability.

A drive suitable for the method of the present invention is in essence characterized in that a coupling is provided which limits the transferrable torque or turning moments according to a predetermined characterizing curve or line, whereby the speed of rotation of the spindle is limited during introduction of the rod into the ball pile by a free-running drive or freewheel causing engagement when the driven end speed of the coupling equals the driving speed, said coupling being provided between the drive motor and the spindle.

With such an absorber rod drive according to the present invention, there is transmitted to the rod a constant advancing or feeding force or a force limited to a maximum value corresponding to the strength of the balls and the stability of the rod, with simultaneous limitation of the feeding or advancing speed.

A hydrodynamic coupling according to the Föttinger principle, or a combination between oil pump and oil motor with a pressure limiting valve in the connecting line, is especially suitable as a coupling between the drive motor and the spindle.

According to the present invention, accordingly, during introduction of the absorber rod into the ball pile there is eliminated a rigid or fixed transmission ratio during the feeding or advancing movement, while however there is assured that constantly limited feeding or advancing forces exist, and that a maximum speed is not exceeded. Such a wear-free torque or turning moment limitation can be suitably realized in a hydraulic-hydrodynamic manner. Under certain circumstances, however, drive mechanisms or couplings are also possible on an electrical basis or on the basis of magnetic forces.

Figure 1:
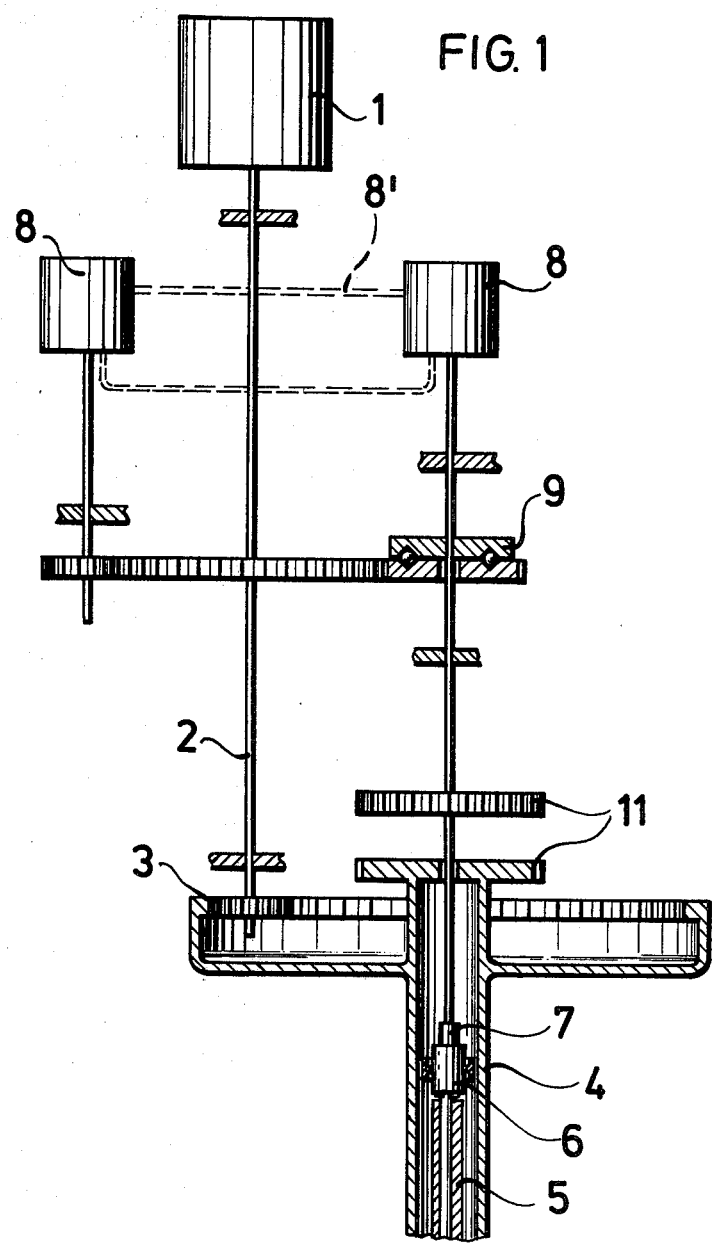
FIG. 1 shows a drive with an oil pump and an oil motor (which can be replaced by a generator or by a hydraulic or electrical system)

Referring now to the drawings in detail, according to FIG. 1, the drive motor 1 drives a shaft 2 which, by way of a transmission or gearing 3, provides the drive of the rotary pipe or tube 4. Within this rotary pipe 4 or tube 4 is journalled a hollow shaft 6 which is axially displaceable but is fixed against rotation. An absorber rod 5, an end of which is shown, is rigidly connected with the hollow shaft 6. The spindle 7, with its spindle nut, provides for the advancing or feeding of the rod. The spindle 7, during introduction and removal of the rod, is driven by elements 8 (oil pump and oil motor), which are provided with a connecting line 8' having a pressure limiting valve, over the freewheel or free-running drive 9. The pressure limiting valve effects a limitation of the oil pressure, and accordingly of the torques of the oil motor. The oil circulation in the return path proceeds by way of the oil sump of the drive.

Figure 2:
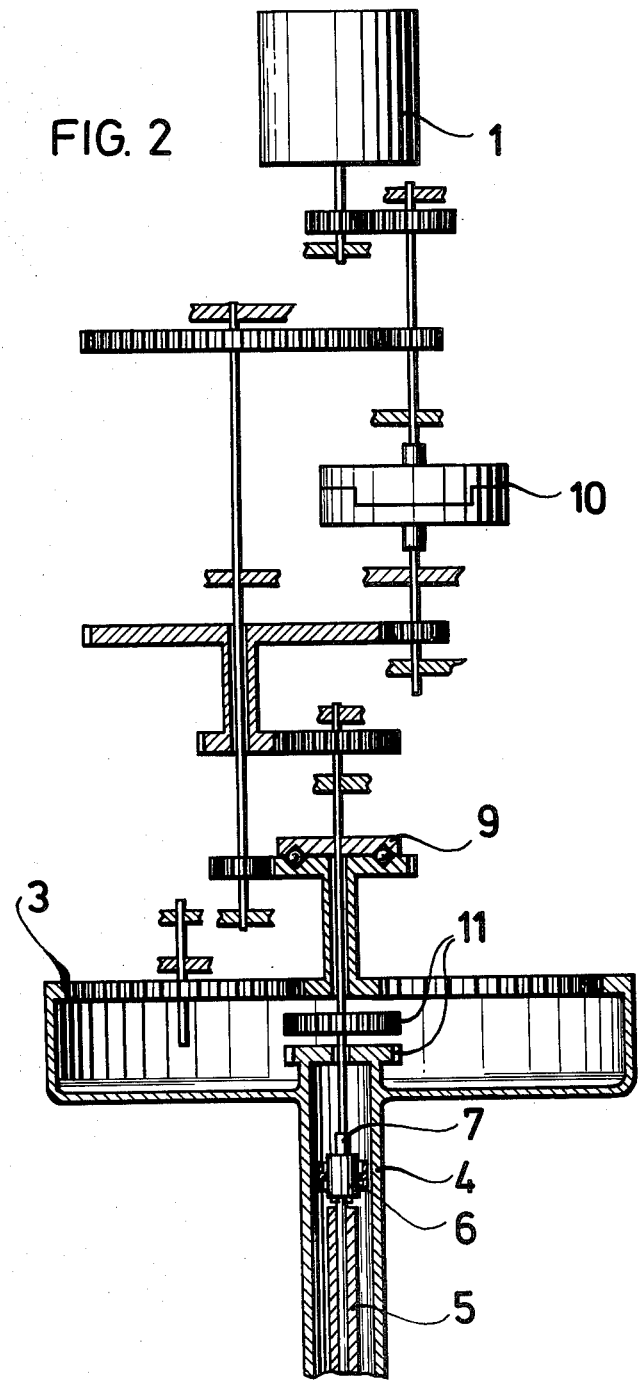
FIG. 2 shows a drive variation with a hydrodynamic coupling which operates at a high speed.

The drive shown in FIG. 2 differs from that shown in FIG. 1 in that the pump and motor are combined into a Föttinger coupling (hydrodynamic coupling) 10. (Föttinger fluid torque converter).

A measuring drive 11 is provided with both embodiments. It comprises an element connected with the rotary tube 4, and an element rigidly connected with the spindle 7. The differential monitoring of the two elements respectively provides the position of the rod at any given time, and the momentary drive speed of the rod.

The present inventive drive offers the following possibilities, depending on the selected drive variation:

the drive of the spindle can, during introduction of the rod into the ball pile, occur with constant moment or according to a predetermined torque characteristic line;

the turning moment or torque limitation occurs free of wear;

for the removal or retraction of the rod from the ball pile there can be selected a fixed transmission ratio with which no conveying effect arises;

the feeding or advancing speed, during introduction of the rod, can be limited to a maximum value corresponding to the zero conveying effect;

the drive requires no switch or control elements, and no external supply units; and the feeding or advancing speed of the rod is not fixed at a constant value.

The present invention is, of course, in no way restricted to the specific disclosure of the specification and drawings, but also encompasses any modifications within the scope of the appended claims.

What I claim is:

1. A drive for actuating absorber rods in pebble bed reactors, with which a respective rod is selectively movable into and out of the ball pile in a rotary manner with limited advancing speed and with both a longitudinal displacement as well as a rotation of a rod operatively connected therewith, said drive comprising in combination;

a drive motor;

an axially fixed advancing spindle having a spindle nut rigidly connected with said absorber rod;

a rotary tube driven at constant speed, said spindle nut being journalled in said rotary tube in such a way permitting said nut to be axially displaceable yet having said nut fixed against rotation in said tube;

a free-running drive or freewheel operatively connected with said drive motor and said spindle, removal of said rod from said ball pile occurring at a fixed ratio between driving mechanism and driven end by said freewheel; and a hydrodynamic torque limiting coupling provided between said drive motor and said spindle to limit transferrable torque, the rotary speed of said spindle being limited during introduction of said rod into said ball pile by said free-running drive causing engagement when the driven end speed of said coupling equals the driving speed by transmitting to said rod an advancing force commensurate with ball strength and rod stability so that ball destruction and bending-through of the rod are safely avoided wherein the linear movement of said rod is transmitted thereto only by said coupling.

2. A drive in combination according to claim 1, in which said coupling comprises a hydraulic coupling of an oil pump and an oil motor.

3. A drive in combination according to claim 1, in which said coupling comprises a fluid torque converter.

4. A method of actuating absorber rods in pebble bed reactors according to claim 1, according to which a respective rod is selectively moved into and out of the ball-pile in a rotary manner with limited advancing speed, said method comprising in combination therewith the step of transmitting to said rod through a fluid coupling only an advancing force commensurate with the ball strength and the rod stability so that ball destruction and bending-through of the rod are safely avoided.

* * * * *